United States Patent
Lee et al.

(10) Patent No.: US 7,013,131 B2
(45) Date of Patent: Mar. 14, 2006

(54) METHOD FOR TRANSMITTING/RECEIVING CALLER IMAGE INFORMATION IN MOBILE TELECOMMUNICATIONS SYSTEM

(75) Inventors: Sung-Eun Lee, Puchon-shi (KR); Kyou-Woong Kim, Suwon-shi (KR); Hyun-Jung Moon, Songnam-shi (KR); Young-Hoon Cheong, Seoul (KR)

(73) Assignee: Samsung Electronics Co., Ltd., (KR)

( * ) Notice: Subject to any disclaimer, the term of this patent is extended or adjusted under 35 U.S.C. 154(b) by 511 days.

(21) Appl. No.: 10/186,842

(22) Filed: Jul. 1, 2002

(65) Prior Publication Data

US 2003/0054863 A1  Mar. 20, 2003

(30) Foreign Application Priority Data

Sep. 19, 2001 (KR) .............................. 2001-58011

(51) Int. Cl.
  *H04M 3/42* (2006.01)
  *H04Q 7/20* (2006.01)
(52) U.S. Cl. .................. 455/415; 455/567; 455/517; 455/450; 455/445; 455/566; 379/93.23; 379/142.06
(58) Field of Classification Search ............. 455/556.1, 455/556.2, 557, 422.1, 426.1, 428, 517, 560, 455/566, 465, 466, 450–455, 414.1, 415, 455/416, 567, 458; 379/93.23, 142.06, 142.17; 348/14.02
See application file for complete search history.

(56) References Cited

U.S. PATENT DOCUMENTS

| | | | | |
|---|---|---|---|---|
| 5,268,904 A | * | 12/1993 | Umeda | 370/251 |
| 5,699,413 A | * | 12/1997 | Sridhar | 379/93.09 |
| 6,144,647 A | * | 11/2000 | Lopez-Torres | 370/329 |
| 6,282,190 B1 | * | 8/2001 | Helfand | 370/352 |
| 6,317,609 B1 | * | 11/2001 | Alperovich et al. | 455/556.1 |
| 6,539,240 B1 | * | 3/2003 | Watanabe | 455/566 |
| 6,584,321 B1 | * | 6/2003 | Coan et al. | 455/466 |
| 6,675,008 B1 | * | 1/2004 | Paik et al. | 455/415 |
| 6,687,515 B1 | * | 2/2004 | Kosaka | 455/566 |
| 6,795,715 B1 | * | 9/2004 | Kubo et al. | 455/556.1 |
| 2003/0032414 A1 | * | 2/2003 | Melaku et al. | 455/415 |

FOREIGN PATENT DOCUMENTS

CN  1291018 A  4/2001
WO  WO 01/03406  1/2001

OTHER PUBLICATIONS

Chinese Office Action dated Feb. 20, 2004 issued in a counterpart application, namely, Appln. No. 02127039.2.

* cited by examiner

*Primary Examiner*—Duc Nguyen
(74) *Attorney, Agent, or Firm*—Dilworth & Barrese LLP

(57) ABSTRACT

A method for displaying caller information using image data in a mobile telecommunications system. If a call origination has occurred, a calling user element sets up a voice data channel with a called user element and forms a data path with the called user element to transmit caller image information. Then, the calling user element transmits the caller image information to the called user element over the data path.

19 Claims, 5 Drawing Sheets

| LCD TYPE | IMAGE TYPE | | CHANNEL TYPE | | | | | | | |
|---|---|---|---|---|---|---|---|---|---|---|
| | | | 16K | | 32K | | 64K | | 128K | |
| | | | RATE | | RATE | | RATE | | RATE | |
| | QCIF(176 X 144) | SQCIF(128 X 96) | QCIF | SQCIF | QCIF | SQCIF | QCIF | SQCIF | QCIF | SQCIF |
| Mono LCD (1pixel=1bit) | 176 X 144 X 1 = 25344bits | 128 X 96 X 1 = 12288bits | 1.58sec | 0.7sec | 0.8sec | 0.38sec | 0.4sec | 0.2sec | 0.2sec | 0.1sec |
| 4 Gray LCD (1pixel=2bit) | 176 X 144 X 2 = 50688bits | 128 X 96 X 2 = 24576bits | 3.16sec | 1.5sec | 1.6sec | 0.76sec | 0.8sec | 0.38sec | 0.4sec | 0.2sec |
| 16 Color (1pixel=4bit) | 176 X 144 X 4 = 101376bits | 128 X 96 X 3 = 49152bits | 6sec | 3sec | 3.2sec | 1.53sec | 1.58sec | 0.77sec | 0.8sec | 0.38sec |
| 256 Color (1pixel=8bit) | 176 X 144 X 8 = 202752bits | 128 X 96 X 4 = 98304bits | 12.7sec | 6sec | 6.3sec | 3sec | 3.2sec | 1.5sec | 1.6sec | 0.8sec |

FIG. 5

METHOD FOR TRANSMITTING/RECEIVING CALLER IMAGE INFORMATION IN MOBILE TELECOMMUNICATIONS SYSTEM

PRIORITY

This application claims priority to an application entitled "Method For Transmitting/Receiving Caller Image Information In Mobile Telecommunications System", filed in the Korean Industrial Property Office on Sep. 19, 2001 and assigned Serial No. 2001-58011, the contents of which are hereby incorporated by reference.

BACKGROUND OF THE INVENTION

1. Field of the Invention

The present invention relates to a mobile telecommunications system, and more particularly to a method for displaying caller information using image data.

2. Description of the Related Art

A code division multiple access (referred to hereinafter as CDMA) system, one of several mobile telecommunications systems, is classified into two types, a synchronous mode system and an asynchronous mode system. A description will hereinafter be given of a wide-band code division multiple access (referred to hereinafter as W-CDMA) communication system associated with an asynchronous UMTS (Universal Mobile Telecommunications System), which is a next-generation mobile telecommunications system. However, the present invention is not limited to the W-CDMA communication system. Needless to say, the present invention could be applied to CDMA-based mobile telecommunications systems of other types, such as CDMA 2000.

With the advent of sophisticated modern society, the mobile telecommunications systems have been rapidly developed on the basis of personal information communication systems. User elements such as pagers, mobile stations and the like have rapidly come into wide use at a low cost according to the development of the mobile telecommunications systems. With a rapid increase in the use of mobile telephones, users of the mobile telephones are provided with various convenient services, for example, a short message service (SMS) and caller information display service. However, the caller information display service restrictively offers a service simply displaying a caller identification (ID) which is a telephone number of a caller, i.e. a user of a transmitting party. Therefore, a user of a receiving party can identify information about the transmitting user only by viewing the caller ID, thereby causing the receiving user to be provided with limited information about the transmitting user.

The SMS enables a transmitting party to transmit a message to a receiving party regardless of the status of the receiving party, e.g. in cases where the receiving party is in a call connection state or where it is impossible to trace the location of the receiving party. Besides, it is possible to provide the service at a low cost compared to voice communications. However, the SMS only offers a service for transmitting short character messages, which is a point-to-point service, so it is impossible to fully satisfy desires, e.g. a desire for transmission of image data, of next-generation mobile telecommunications system users. In other words, the SMS can only transmit short character data, so it is impossible to transmit data exceeding a fixed size, e.g. mass data such as image data, to the receiving party. Consequently, there is a problem in that data to be transmitted is limited in size.

SUMMARY OF THE INVENTION

Therefore, the present invention has been made in view of the above problems, and it is an object of the present invention to provide a method for displaying caller information using image data.

It is another object of the present invention to provide a method for providing a data path to transmit image data in a mobile telecommunications system.

It is yet another object of the present invention to provide a method for displaying caller information using image data to meet users' desires.

In accordance with one aspect of the present invention, the above and other objects can be accomplished by the provision of a method for transmitting/receiving caller image information in a mobile telecommunications system, comprising a calling user element setting up a voice data channel with a called user element corresponding to a call origination if the call origination is detected; forming a data path for transmission of the caller image information with the called user element after setting up the voice data channel; and transmitting the caller image information to the called user element over the formed data path.

In accordance with another aspect of the present invention, there is provided a method for transmitting/receiving caller image information in a mobile telecommunications system, comprising the steps of setting up a voice data channel between a calling user element and a called user element where an originating signal is detected corresponding to the originating signal; the calling user element determining whether the voice data channel has a capacity sufficient to additively transmit the caller image information, after the voice data channel is set up; and the calling user element transmitting the caller image information to the called user element over the voice data channel if the voice data channel is determined to have the capacity sufficient to additively transmit the caller image information.

BRIEF DESCRIPTION OF THE DRAWINGS

The above and other objects, features and advantages of the present invention will be more clearly understood and become more apparent from the following detailed description taken in conjunction with the accompanying drawings, in which:

FIG. 5 is a table illustrating examples of times required to transmit/receive caller image information in accordance with a preferred embodiment of the present invention.

DETAILED DESCRIPTION OF THE PREFERRED EMBODIMENTS

Figure 1:
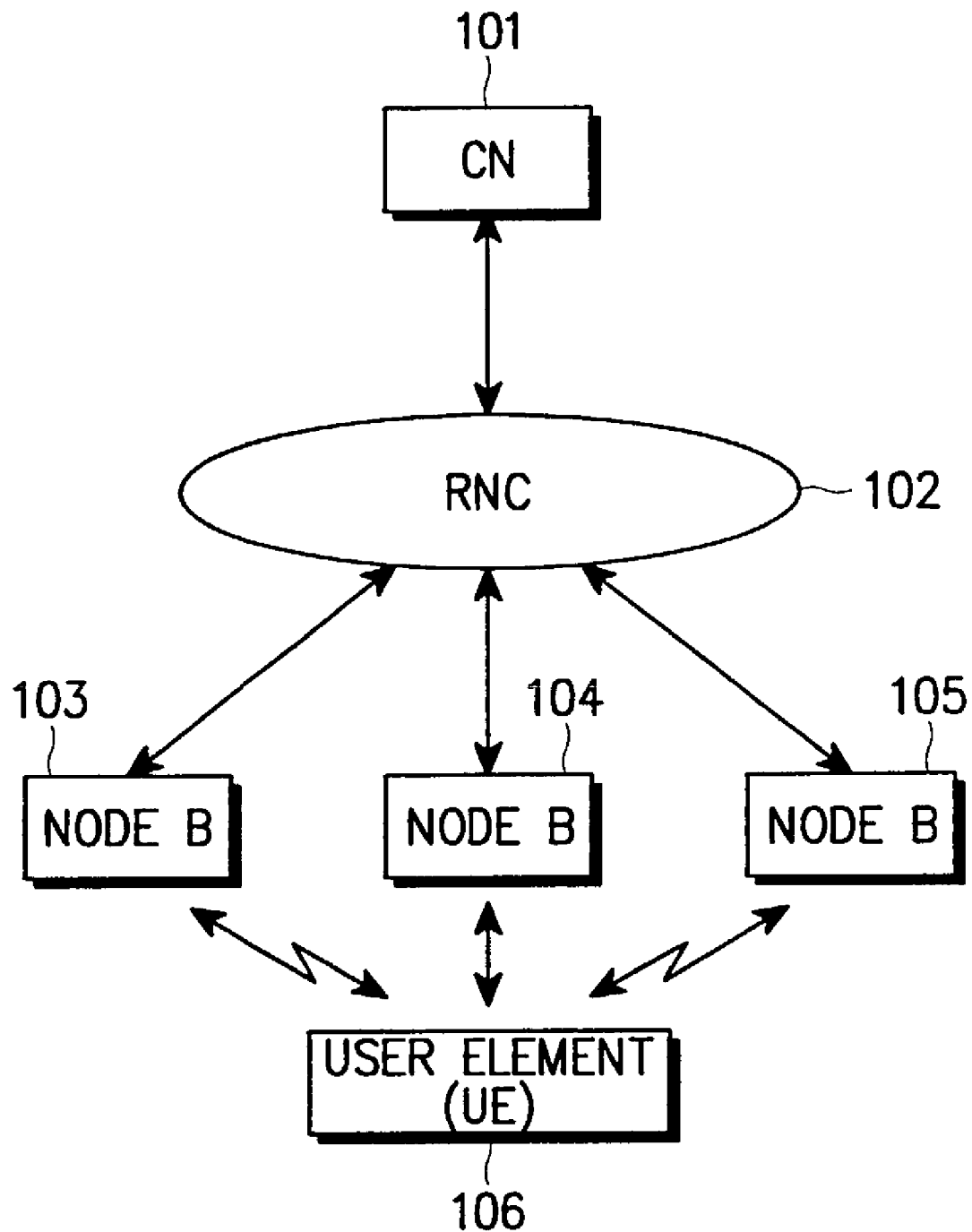
FIG. 1 is a block diagram schematically showing the construction of a mobile telecommunications system for execution of a caller image information transmission/reception method in accordance with a preferred embodiment of the present invention.

Now, preferred embodiments of the present invention are made in reference to the annexed drawings. In the drawings, the same or similar elements are denoted by the same reference numerals even though they are depicted in different drawings. In the following detailed description, functions and configurations that are known to those having ordinary skill in the art are omitted for the sake of clearness in understanding the concept of the invention.

With reference to FIG. 1, there is schematically shown in block form the construction of a mobile telecommunications system for execution of a caller image information transmission/reception method in accordance with a preferred embodiment of the present invention.

As shown in FIG. 1, the mobile telecommunications system comprises a radio network controller (RNC) 102 for performing connection processes related to a user element (UE) 106. The RNC 102 is connected to a core network (CN) 101. In detail, the RNC 102 performs resource assignment to UEs connected to one or more base stations (Node Bs) 103, 104 and 105. The telecommunications system, which is composed of the User Element 106, the Node Bs 103, 104 and 105, the RNC 102 and the CN 101, is called a UMTS terrestrial radio access network (UTRAN).

If the RNC 102 accomplishes the resource assignment for the UE 106 to be successfully connected to any one of the Node Bs, the UE 106 maintains the connection by means of a downlink or uplink dedicated physical channel (referred to hereinafter as DPCH). The W-CDMA system utilizes an asynchronous mode in which a plurality of UEs are not synchronized with the Node Bs. The RNC 102 can communicate with the plurality of UEs via any one of the Node Bs, e.g., the Node B 103. In this case, each of the UEs scrambles data using its own scrambling code and transmits the scrambled data to the Node B 103 over the uplink channel so that the Node B can distinguish respective data transmitted from the plurality of UEs.

The construction of the mobile telecommunications system for execution of the caller image information transmission/reception method in accordance with the preferred embodiment of the present invention has been described with reference to FIG. 1. Hereinafter, an internal construction of the user element in the system of FIG. 1 will be described with reference to FIG. 2.

Figure 2:
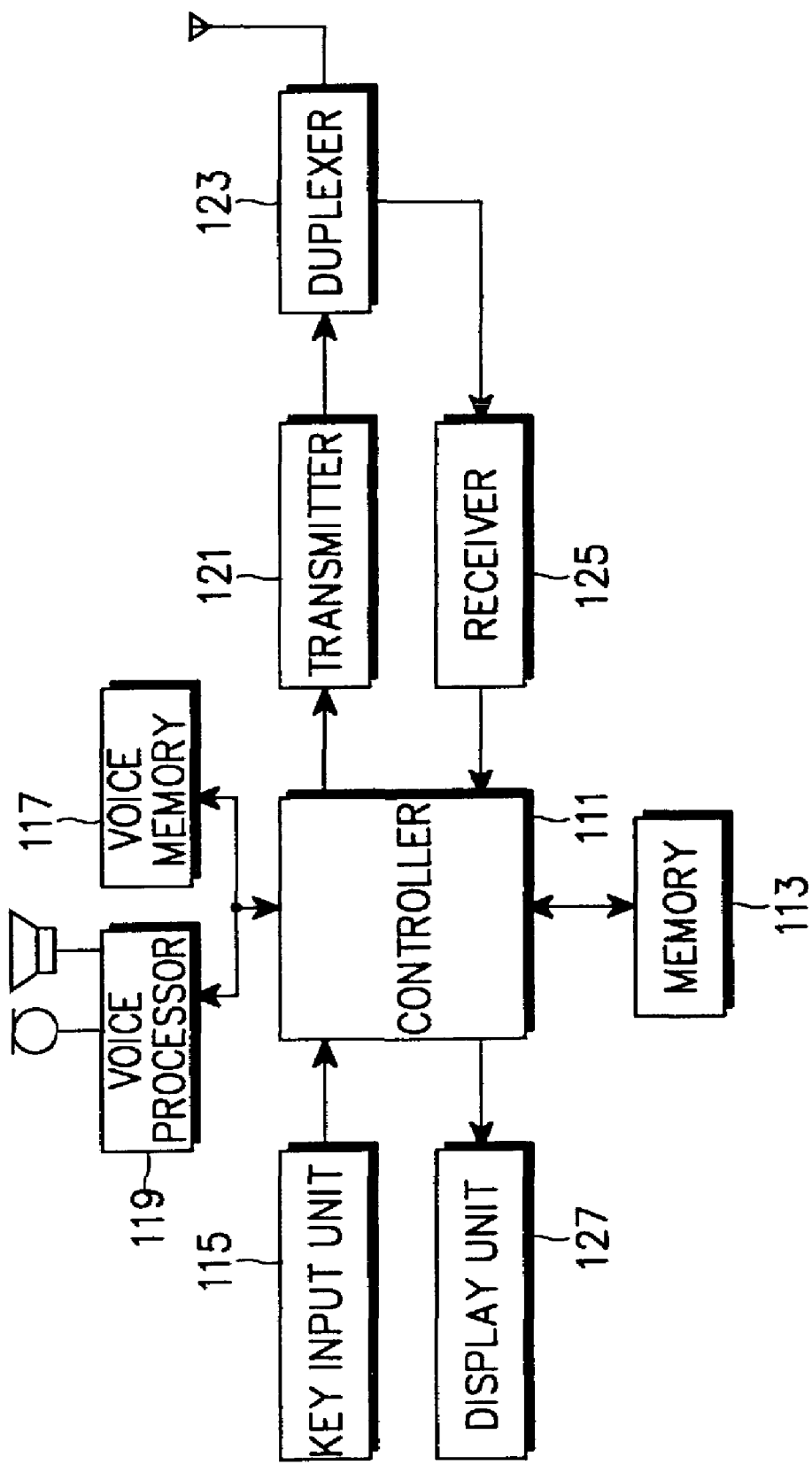
FIG. 2 is a block diagram showing an internal construction of a user element in the system of FIG. 1.

FIG. 2 is a block diagram showing an internal construction of the user element in the system of FIG. 1.

Referring to FIG. 2, the UE includes a controller 111 for controlling the overall operation of the UE and a memory 113 for storing control data generated according to a control program of the UE and under the control of the controller 111. In the present embodiment, particularly, the memory 113 stores image data, such as character image data or still image data, representing caller image information when a call origination occurs in the UE. The image data may be used for simply representing caller information or for commercial business.

The UE includes a key input unit 115 that includes a plurality of dialing digit keys, a menu key and a send key. The key input unit 115 acts to generate a signal corresponding to a key entered by a user and transmit the generated signal to the controller 111. In a preferred embodiment of the present invention, particularly, the key input unit 115 includes a caller image information selection mode key and a caller image information selection key. The caller image information selection mode key functions to change a current mode of the UE to a caller image information selection mode where a specific one of the image data stored in the memory 113 is selected as caller image information to be transmitted when a call origination occurs in the UE. The caller image information selection key serves to select the specific image data as the caller image information in the caller image information selection mode. The caller image information selection mode key can be implemented with a separate key on the key input unit 115 or a combination of some of the plurality of keys provided on the key input unit 115, for example, a combination of "menu key+dialing digit key 1+dialing digit key 3". The caller image information selection key can also be implemented in the same manner as the caller image information selection mode key.

Further, the UE includes a voice memory 117 for storing a plurality of voice messages, and a voice processor 119 for converting a voice message read from the voice memory 117 into an analog signal and outputting the converted analog signal through a speaker, under the control of the controller 111. The voice processor 119 is further adapted to input an analog voice signal from the user through a microphone and convert the inputted analog voice signal into a digital signal.

Furthermore, the UE includes a transmitter 121 for modulating an input signal from the controller 111 into a digital radio signal and transferring the modulated digital radio signal to a duplexer 123. The duplexer 123 acts to transmit the digital radio signal from the transmitter 121 through an antenna, and transfer a radio signal received through the antenna to a receiver 125. The receiver 125 demodulates the radio signal from the duplexer 123 and transfers the demodulated signal to the controller 111. Then, the controller 111 controls a call on the basis of the demodulated signal from the receiver 125. Besides, the UE includes a display unit 127 that is typically provided with a liquid crystal display (LCD), light emitting diode (LED) or the like. The display unit 127 functions to display UE control data and input data under the control of the controller 111.

A procedure of selecting caller image information when a call origination occurs will be hereinafter described with reference to FIG. 3.

Figure 3:
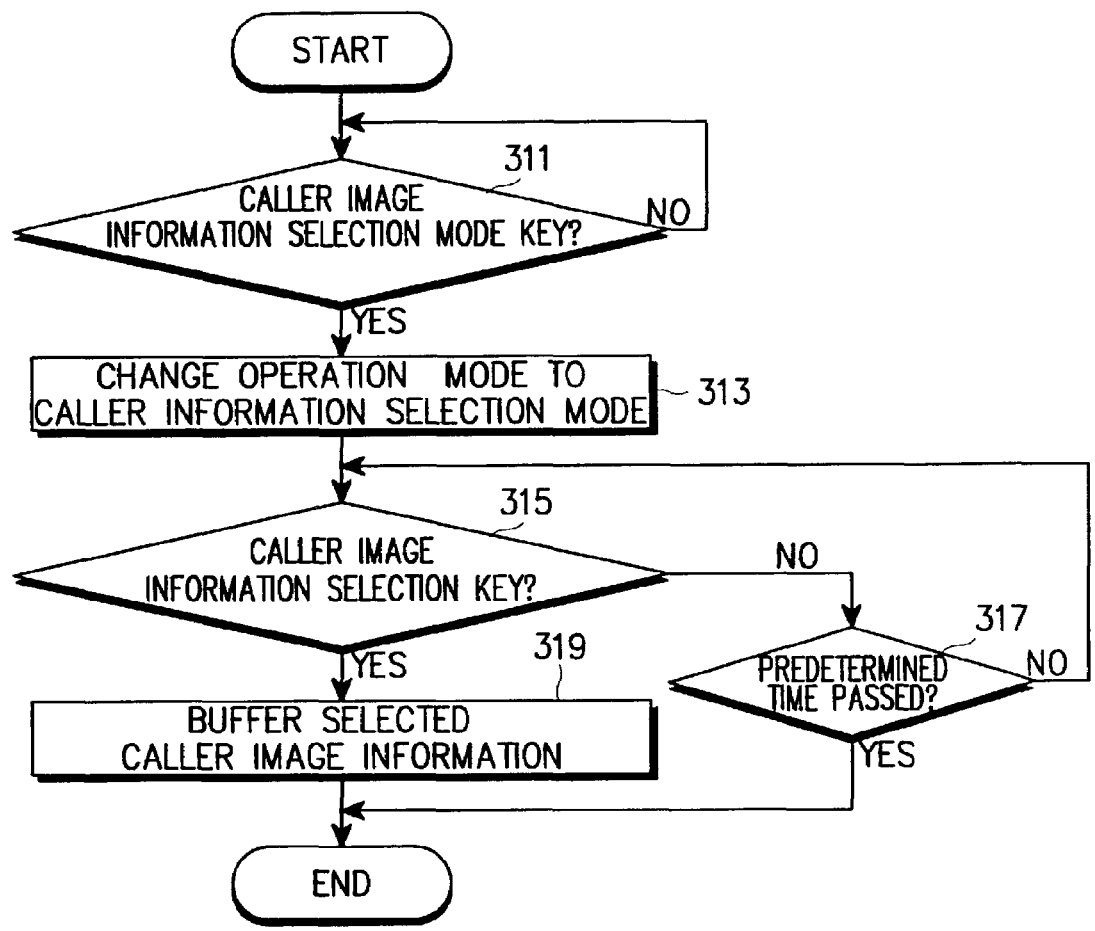
FIG. 3 is a flow chart illustrating a procedure of selecting caller image information in accordance with a preferred embodiment of the present invention.

FIG. 3 is a flow chart illustrating a procedure of selecting caller image information in accordance with a preferred embodiment of the present invention.

Referring to FIG. 3, if the caller image information selection mode key on the key input unit 115 is entered (step 311), the UE controller 111 changes the current operation mode of the UE to the caller image information selection mode (step 313). As described above with reference to FIG. 2, the caller image information selection mode key acts to change a current mode of the UE to the caller image information selection mode where a specific one of the image data in the memory 113 is selected as caller image information to be transmitted. The image data can be of a character image data type or still image data type, and are data based in the memory 113. The caller image information selection mode allows the UE user to select a desired one of the caller image information, i.e., the image data stored in the memory 113. In detail, in the caller image information selection mode, a list of the image data or a list of numbers corresponding respectively to the image data is displayed, and the user can select a desired number or image data from the list.

The controller 111 determines whether a caller image information selection key signal from the key input unit 115 is inputted in the caller image information selection mode (step 315). The caller image information selection key is used to select any one from among a plurality of selectable images in the caller image information selection mode. For example, assume that images numbered sequentially from 1 to 10 are listed. If the number 2 is selected, the corresponding image is selected. If it is determined at the above step 315 that no caller image information key signal is inputted, the controller 111 determines whether a predetermined period of time, for example, 5 seconds has passed (step 317). If the predetermined time period is determined not to have passed, the controller 111 continuously waits for the predetermined time period for a caller image information selection key signal to be inputted.

Meanwhile, in the case where it is determined at the above step 315 that a caller image information selection key signal is inputted, the controller 111 buffers a selected caller image signal corresponding to the inputted caller image information selection key signal (step 319), and then ends the caller image information selection procedure. The reason why the selected caller image signal is buffered is that it must be put on standby so as to be appended to a call when a call origination occurs in the UE. Needless to say, it is possible that caller image information is selected directly in the caller image information selection mode and transmitted when a call origination occurs.

Hereinafter, a procedure of transmitting/receiving the caller image information when an actual call origination/termination occurs in the UE will be described with reference to FIG. 4.

Figure 4:
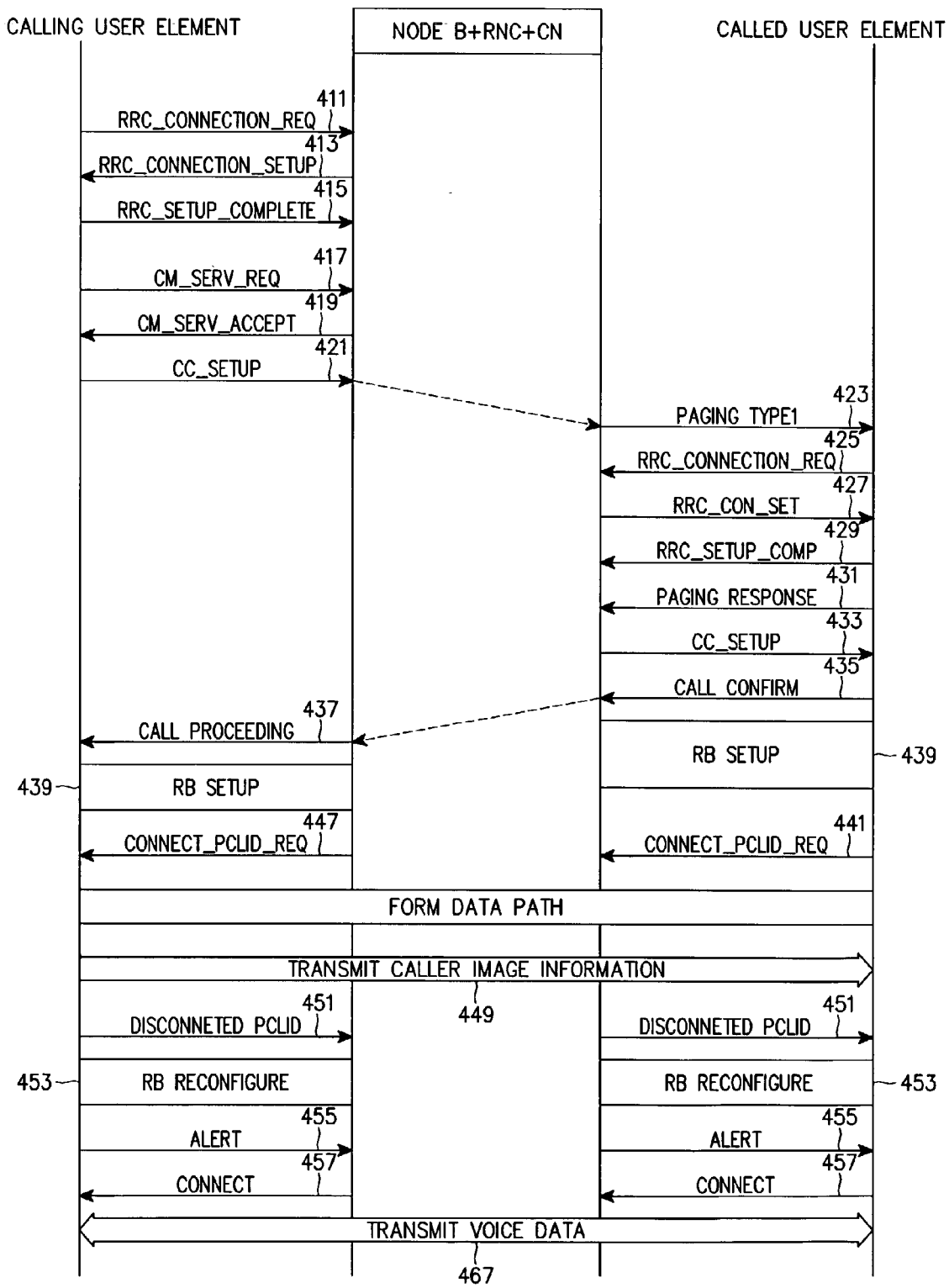
FIG. 4 is a signal sequence diagram illustrating a procedure of transmitting/receiving caller image information in accordance with a preferred embodiment of the present invention.

FIG. 4 is a signal sequence diagram illustrating a procedure of transmitting/receiving the caller image information in accordance with a preferred embodiment of the present invention.

Referring to FIG. 4, a calling UE transmits/receives signals to/from a called UE via a network, i.e., a network composed of the Node B, RNC 102 and CN 101. First, the calling UE transmits an RRC(radio resource controller)_CONNECTION_REQ message to the network (step 411). The RRC_CONNECTION_REQ message is transmitted to request the network to assign a channel for transmission of an originating signal from the calling UE. An RRC layer is provided to control radio resources of the network. The network sets up a calling UE channel in response to the RRC_CONNECTION_REQ message from the calling UE and then transmits an RRC_CONNECTION_SETUP message to the calling UE (step 413). The calling UE recognizes the channel setup in response to the RRC_CONNECTION_SETUP message transmitted from the network, and then transmits an RRC_CONNECTION_COMPLETE message to the network (step 415). In this manner, the channel assignment to the calling UE is completed through the above steps 411, 413 and 415.

After the channel assignment is completed, the calling UE transmits a CM (call management)_SERV_REQ message to the network (step 417). The CM_SERV_REQ message is transmitted to request the network to provide a CM service for setup of environments of the calling UE. The CM_SERVE_REQ message includes information regarding the type of a CM service for setup of environments between the calling UE and the network, and parameters such as a UE identification (ID) and the like. The network transmits a CM_SERV_ACCEPT message to the calling UE in response to the CM_SERV_REQ message from the calling UE (step 419).

When the environment setup between the calling UE and the network is accomplished through the above steps 417 and 419 as described above, the calling UE transmits a CC_SETUP message to a called UE via the network (step 421). The CC_SETUP message, which is an originating message of the calling UE, includes parameters related to environment information of the calling UE. If the network, i.e., the Node B to which the called UE corresponding to the CC_SETUP message belongs, receives the CC_SETUP message, then it transmits a paging message PAGING TYPE 1 indicative of call reception to the called UE corresponding to the CC_SETUP message (step 423). Then, the called UE transmits an RRC_CONNECTION_REQ message for channel assignment to the network in response to the paging message (step 425). The RRC_CONNECTION_REQ message is transmitted to request the network to assign a channel for transmission of a terminating signal. In response to the RRC_CONNECTION_REQ message from the called UE, the network sets up a called UE channel and then transmits an RRCConnectionSetup (RRC_CON_SET) message to the called UE (step 427). Upon receiving the RRC_CON_SET message, the called UE recognizes the channel setup, and then transmits an RRC_SETUP_COMPLETE message to the network (step 429). In this manner, the channel assignment to the called UE is completed through the above steps 425, 427 and 429.

After the channel assignment is accomplished, the called UE transmits a paging response message to the network, particularly to the called party Node B in response to the paging message (step 431). The network transmits the CC_SETUP message to the called UE in response to the paging response message (step 433). The CC_SETUP message is the very one that the calling UE has transmitted via the network at the above step 421. Upon receiving the CC_SETUP message, the called UE transmits a CALL CONFIRM message to the calling UE via the network to confirm that the originating signal incomes (step 435). The CALL CONFIRM message is transmitted from the called UE to the CN 101. Upon receiving the CALL CONFIRM message from the called UE, the CN 101 receives information of the called UE and then transmits the received information to the calling UE (step 437: CALL PROCEEDING).

Then, after receiving the information of the called UE, the calling UE transmits an RB (radio bearer) SETUP message to the network to set up a radio bearer. The network assigns the calling UE a voice data channel for transmission of voice data generated in a call of the originating signal in response to the RB SETUP message transmitted from the calling UE. In the same way, the called UE transmits an RB SETUP message to the network to be assigned a voice data channel for transmission of voice data generated in a call established as the called UE receives the originating signal (step 439). If the channels are formed in response to the radio bearer set-up requests from the calling UE and called UE in this manner, the called UE is able to receive caller image information from the calling UE over the channels. As a result, the called UE transmits a CONNECTION_PCLID_REQ message to the calling UE to form a data path for reception of the caller image information with the calling UE (step 441).

The calling UE forms a data path for transmission/reception of the caller image information data with the called UE in response to the CONNECTION_PCLID_REQ message transmitted from the called UE (step 447). The data path is formed to transmit/receive the caller image information data. On the other hand, if the voice data channel has enough capacity to transmit/receive the caller image information together with the voice data, the calling UE may not form a separate data path. Instead, a part of the voice data channel can be assigned to transmit/receive the caller image information.

However, if the voice data channel does not have enough capacity to transmit/receive the caller image information data with the voice data, the calling UE forms a separate data path, or data channel, to transmit/receive the caller image information. Therefore, the caller image information data is transmitted/received over the newly formed data channel. In other words, in case the voice data channel has a capacity greater than the sum of a capacity of control signaling data for maintenance of the voice data channel, a capacity of the voice data and a capacity of the caller image information, or still image data (voice data channel>(control signaling data+ voice data+caller image information)), a part of the voice data channel would be used without forming a separate data path. On the contrary, if the capacity of the voice data channel is less than the total capacity of the control signaling data for maintenance of the voice data channel, the voice data and the caller image information data, a separate data path, or channel should be formed. In the preferred embodiment of the present invention, a new separate channel will be described to be formed as the data path for the convenience of description. Examples of times required to transmit/receive the caller image information will be described later with reference to FIG. 5.

The calling UE transmits the caller image information, previously selected by the user and buffered as described above with reference to FIG. 3, to the called UE over the newly formed data path (step 449). After completing the transmission of the caller image information to the called UE over the data path, the calling UE transmits a DISCONNECTED PCLID message, which indicates the completion of the caller image information transmission, to the called UE via the network (step 451). The DISCONNECTED PCLID message is transmitted for disconnection of the data path connected to transmit/receive the caller image information data, as the calling UE completes the transmission of the caller image information associated with the call origination.

The called UE transmits an RB RECONFIGURE message for reconfiguration of the radio bearer to the network to disconnect the data path in response to the DISCONNECTED PCLID message. Then, the network disconnects the data path by reconfiguring the radio bearer between the called UE and calling UE in response to the RB RECONFIGURE message (step 453). After disconnecting the data path for transmission of the caller image information, the network generates in the called UE an alert indicating that the call of the originating signal has terminated (step 455). The alert can include the ringing of a bell such as a ring or melody, which represents that the terminating call is present. When the alert is generated in the called UE, the called UE determines whether to establish a call connection or reject the call connection by viewing the received caller image information from the calling UE. Upon detecting a call connection request, the called UE establishes the call connection to the calling UE (step 457). With the call connection established, the calling UE transmits the voice data to the called UE (step 467).

The examples of times required to transmit the caller image information will be described with reference to FIG. 5.

FIG. 5 is a table illustrating the examples of times required to transmit/receive the caller image information in accordance with the preferred embodiments of the present invention.

As shown in FIG. 5, when the calling UE transmits the caller image information, it takes different times to transmit the caller image information depending on LCD types, channel types (based on channel rates) and caller image information types. In detail, the number of data bits to be transmitted per pixel varies with LCD types. The number of data bits to be transmitted varies with caller image information types, e.g., a QCIF image and an SQCIF image. The number of data bits to be transmitted per time varies with channel rates, e.g., 16K, 32K, 64K and 128K. For instance, it takes 0.38 seconds to display a SQCIF image over a 32 kbps channel on a mono LCD (1 pixel=1 bit), as shown in the table of the FIG. 5. That is to say, SQCIF (128×96)=12, 288, channel=32 kbps ⇒ transfer rate=12,288/32=0.384 (sec).

As apparent from the above description, the present invention has the advantage of improving visual effect in that a user of a called UE can identify caller information based on images since a calling UE can transmit the caller image information to the called UE. Further, the present invention has the advantage of maximizing the efficiency of the caller information since the calling UE can transmit image information such as advertising pictures, which is an example of the caller image information. Furthermore, the present invention has the advantage of satisfying desires of users for data transmission since the calling UE/called UE can transmit/receive image data as well as voice data and character data.

Although the preferred embodiments of the present invention have been disclosed for illustrative purposes, those skilled in the art will appreciate that various modifications are possible, without departing from the scope and spirit of the invention as disclosed in the accompanying claims. Therefore, this invention is not to be limited by the described embodiments, but only by the scope of the appended claims and equivalents thereof.

What is claimed is:

1. A method for transmitting/receiving caller image information in a mobile telecommunications system, comprising the steps of:
   a calling user element setting up a voice data channel with a called user element corresponding to a call origination if the call origination is detected;
   the calling user element forming a data path different from the voice data channel for a transmission of caller image information with the called user element after setting up the voice data channel; and
   the calling user element transmitting the caller image information to the called user element over the formed data path so that caller image information is transferred to the called user element before a call connection with the calling user element is established.

2. The method as set forth in claim 1, further comprising the steps of:
   the calling user element transmitting a data path disconnection message to the called user element to disconnect the data path after completing transmission of the caller image information; and
   the called user element disconnecting the data path by transmitting a radio bearer reconfigure message to a network in response to the transmitted data path disconnection message.

3. The method as set forth in claim 1, wherein the caller image information includes character image data and still image data.

4. The method as set forth in claim 1, further comprising the step of:
   the calling user element selecting the caller image information associated with an originating signal before the call origination has occurred.

5. The method as set forth in claim 4, wherein the selecting step further includes the calling user element changing its operation mode to a caller image information selection mode if a caller image information selection mode key is entered; and the calling user element selecting the caller image information associated with the originating signal in the caller image information selection mode according to a user's selection.

6. A method for transmitting/receiving caller image information in a mobile telecommunications system, comprising the steps of:
   a calling user element selecting caller image information associated with a call originating signal;
   the calling user element setting up a voice data channel with a called user element corresponding to a call origination upon detecting the call origination signal after selecting the caller image information;
   the calling user element forming a data path for a transmission of the caller image information with the called user element after setting up the voice data channel; and
   the calling user element transmitting the caller image information to the called user element over the formed data path so that caller image information is transferred to the called user element before a call connection with the calling user element is established.

7. The method as set forth in claim 6, further comprising the steps of:
   the calling user element transmitting a data path disconnection message to the called user element to disconnect the data path after completing transmission of the caller image information; and
   the called user element disconnecting the data path by transmitting a radio bearer reconfigure message to a network in response to the transmitted data path disconnection message.

8. The method as set forth in claim 6, wherein the caller image information includes character image data and still image data.

9. The method as set forth in claim 6, wherein the selecting step includes the steps of:
   the calling user element changing its operation mode to a caller image information selection mode if a caller image information selection mode key is entered; and
   the calling user element selecting the caller image information associated with the originating signal in the caller image information selection mode according to a user's selection.

10. A method for transmitting caller image information in a mobile telecommunications system, comprising the steps of:
    selecting caller image information when a call origination occurs;
    setting up a voice data channel with a called user element corresponding to the call origination upon detecting an originating signal after selecting the caller image information;
    forming a data path for a transmission of the caller image information with the called user element after setting up the voice data channel; and
    transmitting the caller image information to the called user element over the formed data path so that caller image information is transferred to the called user element before a call connection with the calling user element is established.

11. The method as set forth in claim 10, further comprising the step of:
    transmitting a data path disconnection message to the called user element to disconnect the data path after completing transmission of the caller image information.

12. The method as set forth in claim 10, wherein the caller image information includes character image data and still image data.

13. The method as set forth in claim 10, wherein the selecting step includes the steps of:
    changing a current operation mode to a caller image information selection mode if a caller image information selection mode key is entered; and
    selecting the caller image information associated with the originating signal in the caller image information selection mode according to a user's selection.

14. A method for transmitting/receiving caller image information in a mobile telecommunications system, comprising the steps of:
    setting up a voice data channel between a calling user element where an originating signal is detected and a called user element corresponding to the originating signal;
    the calling user element determining whether the voice data channel has a capacity sufficient to additively transmit caller image information after the voice data channel is set up; and
    the calling user element transmitting the caller image information to the called user element over the voice data channel if the voice data channel is determined to have the capacity sufficient to additively transmit the caller image information so that caller image information is transferred to the called user element before a call connection with the calling user element is established.

15. The method as set forth in claim 14, further comprising the steps of:
    the calling user element forming a data path for transmission of the caller image information with the called user element if the voice data channel is determined not to have capacity sufficient to additively transmit the caller image information; and
    the calling user element transmitting the caller image information to the called user element over the data path.

16. The method as set forth in claim 15, further comprising the steps of:
    the calling user element transmitting a data path disconnection message to the called user element to disconnect the data path after completing transmission of the caller image information; and
    the called user element disconnecting the data path by transmitting a radio bearer reconfigure message to a network in response to the transmitted data path disconnection message.

17. The method as set forth in claim 14, wherein the caller image information includes character image data and still image data.

18. The method as set forth in claim 14, further comprising the step of:
    the calling user element selecting the caller image information associated with the originating signal before the originating signal is generated.

19. The method as set forth in claim 18, wherein the selecting step includes the steps of:
    the calling user element changing its operation mode to a caller image information selection mode if a caller image information selection mode key is entered; and
    the calling user element selecting the caller image information associated with the originating signal in the caller image information selection mode according to a user's selection.

* * * * *